No. 843,324. PATENTED FEB. 5, 1907.
E. J. BROOKS.
REINFORCED CEMENT BLOCK.
APPLICATION FILED APR. 16, 1906.
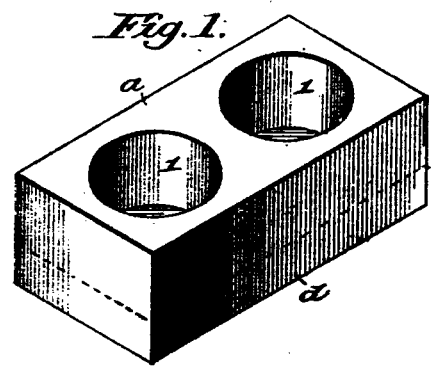
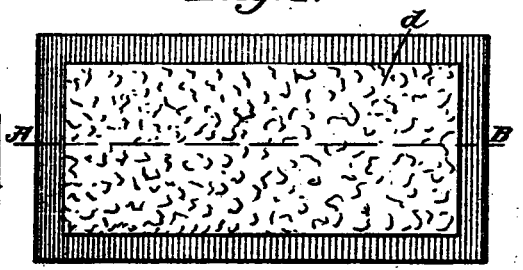
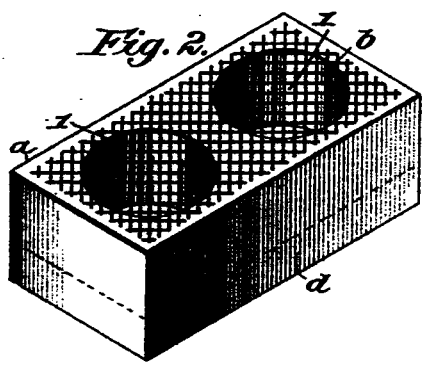
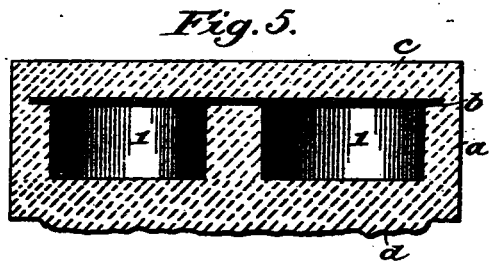
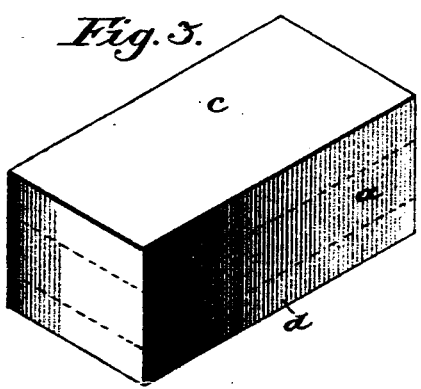
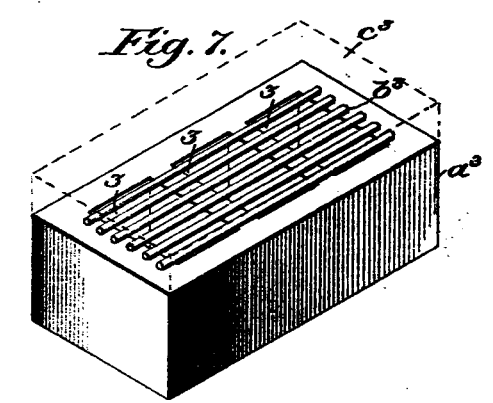
Witnesses:
Inventor:

UNITED STATES PATENT OFFICE.

EDWARD J. BROOKS, OF EAST ORANGE, NEW JERSEY.

REINFORCED CEMENT BLOCK.

No. 843,324.  Specification of Letters Patent.  Patented Feb. 5, 1907.

Application filed April 16, 1906. Serial No. 311,890.

*To all whom it may concern:*

Be it known that I, EDWARD J. BROOKS, a citizen of the United States of America, and a resident of East Orange, in the State of New Jersey, have invented a new and useful Improvement in Reinforced Cement Blocks, of which the following is a specification.

This invention relates to the production of reinforced blocks of artificial stone or "cement," as the material is hereinafter termed; and the present invention consists in the novel product hereinafter described and claimed.

The objects of the invention are to provide for making such blocks hollow, so as to lighten them, and for strengthening them by means of reinforces which bridge the weight-reducing recesses and assist in inseparably attaching solid side portions and at the same time for making the blocks with unbroken sides to contact with the mortar joints of the walls in which they are laid.

A sheet of drawings accompanies this specification as part thereof.

Figures 1, 2, and 3 are perspective views illustrating the process of molding a hollow reinforced building-block according to the present invention. Fig. 4 is a face view of the finished block. Fig. 5 represents a section on the line A B, Fig. 4. Fig. 6 represents a like sectional view of another block embodying the same invention in part; and Fig. 7 is a perspective view, partly in dotted outline, illustrating a third species of the same invention.

Like reference characters refer to like parts in all the figures.

The improved cement block in all its forms includes a hollow portion $a$ or $a^2$ or $a^3$, formed with the aid of a core or cores in customary manner, but with the recess or recesses 1 or 2 or 3 vertical in the mold, a reinforce $b$ or $b^2$ or $b^3$, adapted to bridge the open upper side of the hollow portion in its green or wet condition and to embed itself therein, and a solid side portion $c$ or $c^2$ or $c^3$ in contact with said open side of the hollow portion and inseparably attached to said hollow portion and said reinforce.

In the species illustrated by Figs. 1 to 5, inclusive, a solid face portion or outer side $d$ with any desired surface or configuration (represented in Fig. 4) is first molded and may be of a different composition from the remainder of the block, as represented by the heavier hatching in Fig. 5. While said face portion $d$ is wet or green and otherwise in suitable condition the cores for the hollow portion $a$ are placed thereon, and said hollow portion $a$ is molded in contact with said face portion $d$ and inseparably attached thereto. After withdrawing the core or cores the reinforce $b$ is laid upon the top of the hollow portion $a$ while said hollow portion is still wet or green and in proper condition, and the solid back portion $c$ is immediately molded upon the hollow portion $a$ and reinforce $b$, so as to be inseparably attached to both, which may complete the molding operation. In the species illustrated by Fig. 6 said face portion $d$ is omitted, and the hollow portion $a^2$ has an open side which may be laid toward the air-space of a hollow wall. In the species represented by Fig. 7 the block may be constructed with or without a face portion.

The reinforce $b$ (represented in Figs. 2 and 5) is of wire netting. The reinforce $b^2$ (represented in Fig. 6) is of expanded metal. The reinforce $b^3$ (represented in Fig. 7) is composed of rods laid side by side in sufficient number to bridge the weight-reducing recess. It will be obvious that either form of reinforce may be used in any of the species or other suitable forms adapted to bridge the weight reducing recesses 1, 2, and 3. It will also be obvious that said recesses 1, 2, and 3 may be of any desired shape and number and that their number and proportions are determined by the dimensions of the block and the quantity of material that can be omitted from the interior of the block without injuriously affecting its resistance to crushing strains.

The shape and proportions of the block may of course vary indefinitely, and other like modifications will suggest themselves to those skilled in the art.

The broad idea of embedding metallic reinforces within hollow cement blocks is not claimed herein, as it is old. The distinctive characteristics of the improved blocks herein claimed is that the reinforces are adapted to bridge the recesses in the process of molding the blocks, as hereinbefore described, and in the finished product, and thus greatly facilitate their incorporation in the hollow blocks, especially blocks closed on all sides, and are located in the plane of what was in the mold and is hereinafter termed the "upper side" of each recess. Such bridge-forming reinforces incorporated within hollow cement blocks are believed to be broadly new and are intended to be so claimed.

Having thus described said improvement, I claim as my invention and desire to patent under this specification—

A reinforced cement block including a hollow portion containing one or more recesses, a bridge-forming reinforce in the plane of the upper side of each recess and a solid portion in contact with and inseparably attached to said hollow portion and said reinforce substantially as hereinbefore specified.

EDWARD J. BROOKS.

Witnesses:
W. M. BROOKS,
ELINOR BROOKS.